US012669232B2

(12) United States Patent
Park et al.

(10) Patent No.: US 12,669,232 B2
(45) Date of Patent: *Jun. 30, 2026

(54) DEHUMIDIFIER FOR LAMP OF VEHICLE AND LAMP INCLUDING THE SAME

(71) Applicants:Hyundai Motor Company, Seoul (KR); Kia Corporation, Seoul (KR); HVS, Suwon-si (KR)

(72) Inventors: Yoonsang Park, Gimcheon-si (KR); Jae Deok Kim, Yongin-si (KR)

(73) Assignees: Hyundai Motor Company, Seoul (KR); Kia Corporation, Seoul (KR); HVS, Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/237,227

(22) Filed: Jun. 13, 2025

(65) Prior Publication Data

US 2026/0139813 A1      May 21, 2026

(30) Foreign Application Priority Data

Nov. 20, 2024     (KR) ........................ 10-2024-0166489

(51) Int. Cl.
| | |
|---|---|
| *F21S 45/33* | (2018.01) |
| *F21S 45/20* | (2018.01) |
| *F21S 45/37* | (2018.01) |
| *B60Q 1/00* | (2006.01) |

(52) U.S. Cl.
CPC .............. *F21S 45/33* (2018.01); *F21S 45/20* (2018.01); *F21S 45/37* (2018.01); *B60Q 1/00* (2013.01)

(58) Field of Classification Search
None
See application file for complete search history.

(56) References Cited

U.S. PATENT DOCUMENTS

| | | | |
|---|---|---|---|
| 6,422,729 | B1 | 7/2002 | Rohrbach |
| 11,137,130 | B1 * | 10/2021 | Dry ........................ F21S 45/60 |

(Continued)

FOREIGN PATENT DOCUMENTS

| | | |
|---|---|---|
| CN | 110307521 A | 10/2019 |
| CN | 112367821 A | 2/2021 |

(Continued)

OTHER PUBLICATIONS

Hyundai Motor Company et al., "European Search Report", EP Application No. 25185585.4, dated Nov. 26, 2025, 8 pages.

*Primary Examiner* — Christopher E Dunay
(74) *Attorney, Agent, or Firm* — Slater Matsil, LLP

(57) ABSTRACT

A dehumidifier, and a lamp for a vehicle including the same, can include a dust cover including first communication hole therein, an absorbent cover coupled to the dust cover, wherein a desiccant is accommodated between the dust cover and the absorbent cover, wherein the absorbent cover includes at least one second communication hole therein corresponding to the first communication hole, and a valve configured to selectively open the first communication hole and the second communication hole through a first bracket and a second bracket, which are operated and moved by a shape memory alloy of the valve that is deformed by a temperature difference between an inside of the dust cover and an outside of the dust cover.

20 Claims, 16 Drawing Sheets

(56) References Cited

U.S. PATENT DOCUMENTS

| | | | |
|---|---|---|---|
| 2003/0133310 A1* | 7/2003 | VanDuyn | F21S 45/33 |
| | | | 362/547 |
| 2003/0230460 A1 | 12/2003 | Usui | |
| 2005/0157514 A1 | 7/2005 | Brinkmann | |
| 2018/0142857 A1* | 5/2018 | Park | F21S 45/33 |
| 2018/0328580 A1* | 11/2018 | Tezuka | F21S 45/10 |
| 2019/0120456 A1 | 4/2019 | Noda et al. | |
| 2019/0271449 A1 | 9/2019 | Helwig et al. | |
| 2019/0299152 A1* | 10/2019 | Alexander | F16K 11/052 |
| 2020/0300439 A1* | 9/2020 | Chen | F21S 45/60 |
| 2022/0042668 A1 | 2/2022 | Menn | |
| 2025/0102130 A1* | 3/2025 | Koulouh | F21S 45/60 |

FOREIGN PATENT DOCUMENTS

| | | |
|---|---|---|
| CN | 118475791 A | 1/2023 |
| EP | 1818609 A2 | 8/2007 |
| JP | 2014089928 A | 5/2014 |
| JP | 2023057651 A | 4/2023 |
| KR | 20240042911 A | 4/2024 |

* cited by examiner

DEHUMIDIFIER FOR LAMP OF VEHICLE AND LAMP INCLUDING THE SAME

CROSS-REFERENCE TO RELATED APPLICATIONS

This application claims priority to and the benefit of Korean Patent Application No. 10-2024-0166489 filed with the Korean Intellectual Property Office on Nov. 20, 2024, the entire contents of which are incorporated herein by reference.

TECHNICAL FIELD

The present disclosure relates to a dehumidifier of a lamp for a vehicle and a lamp including the same.

BACKGROUND

In general, vehicles are equipped with various types of lamps that perform a lighting function to easily check positions of objects in a vicinity when driving at night and a signal function to inform the running state vehicle to other vehicles and road users.

For example, lamps that perform the lighting functions include head lamps and fog lamps, and lamps that perform the signal functions include turn signal lamps, tail lamps, and brake lamps.

In these lamps for the vehicle, the temperature inside the lamp changes as the light source module inside turns on or off. That is, as the temperature rises when the light source module is turned on, the air inside the lamp expands and the air is discharged to the outside through a vent hole provided in the lamp. Conversely, when the light source module is turned off and the air inside the lamp contracts, an external air flows into the inside of the lamp through the vent hole. Accordingly, when the external air flows into the interior of the lamp, the moisture included in the air also flows into the interior of the lamp.

However, because the lamp is exposed to the outside of the vehicle, if the vehicle is washed after the driving or left in an environment with low external temperature for a long time, the temperature of the lamp may drop below a dew point, which may cause a condensation inside the lamp, resulting in a failure of the light source module of the amp, or the deterioration of the function of the lamp.

The above information disclosed in this Background section is only for enhancement of understanding of the background of the present disclosure and therefore it may contain information that does not form the prior art that is already publicly known, available, or in use.

SUMMARY

The present disclosure relates to a dehumidifier of a lamp for a vehicle, and a lamp including the same, and more particularly, the present disclosure relates to a dehumidifier for a lamp of a vehicle, which may improve the durability of the lamp by efficiently controlling the humidity inside the lamp for the vehicle, thereby preventing a condensation of the lamp due to a moisture, and preventing a damage to an electronic device due to moisture.

In an embodiment of the present disclosure, a task to be solved can be to provide a dehumidifier of a lamp for a vehicle and a lamp including the same, which may improve a performance of a desiccant.

A dehumidifier of a lamp for a vehicle according to an embodiment of the present disclosure may include: a dust cover in which a first communication hole (i.e., at least one first communication hole) is formed; an absorbent cover provided on the dust cover, in which a desiccant for absorbing a moisture included in an air is accommodated, and in which a second communication hole corresponding to the communication hole is formed; and a valve that selectively opens the first communication hole and the second communication hole through a first bracket and a second bracket, which are operated by a shape memory alloy that is deformed by a temperature difference between the inside and the outside of the dust cover.

In some embodiments, the valve may include: an opening/closing plate formed of a shape memory alloy and deformed into a first shape and a second shape according to a change in a temperature, thereby causing the first bracket and the second bracket to reciprocally move in a set, selected, or predetermined direction; the first bracket provided on one side of the opening/closing plate and having a first blocking portion formed corresponding to the first communication hole; and the second bracket provided on the other side of the opening/closing plate and having a second blocking portion formed corresponding to the second communication hole.

In some embodiments, the first bracket and the second bracket may be provided so as to be able to move as one body through a coupling member.

In some embodiments, the coupling member may include a hook groove formed in one of the first bracket or the second bracket; and a hook protrusion formed on the other of the first bracket or the second bracket and hooked onto the hook groove.

In some embodiments, a guide member that guides the movement of the first bracket and the second bracket may be further included.

In some embodiments, the guide member may include: a first guide boss formed on the dust cover; a first guide hole formed in the first bracket and movably inserted into the first guide boss; a second guide boss formed on the absorbent cover; and a second guide hole formed in the second bracket and movably inserted into the second guide boss.

In some embodiments, the valve may further include an O-ring provided in each of the first blocking section and the second blocking section.

In some embodiments, a fixing member that selectively fixes the opening/closing plate in a first position and a second position when the first bracket and the second bracket selectively block the first communication hole and the second communication hole according to the deformation of the opening/closing plate may be further included.

In some embodiments, the fixing member may include: a first bolt provided on the dust cover; a second bolt provided on the absorbent cover; and a magnetic body provided on each of the first bolt and the second bolt, and to which the opening/closing plate is selectively attached.

In some embodiments, one end of the opening/closing plate may be implemented as a fixed end that is fixed between the dust cover and the absorbent cover, and the other end of the opening/closing plate may be implemented as a free end that is inserted between the first bracket and the second bracket.

In some embodiments, when the surrounding temperature of the valve is below a set, selected, or predetermined temperature, the opening/closing plate of the valve may be deformed to the first shape, depending on the deformation of the opening/closing plate, the first bracket and the second bracket may move by the other end of the opening/closing plate so that the first blocking portion of the first bracket may block the first communication hole, and the second blocking portion of the second bracket may open the second communication hole.

In some embodiments, the first shape may be a shape in which the other end of the opening/closing plate is deformed to move the first bracket and the second bracket toward the first communication hole.

In some embodiments, when the ambient temperature of the valve is higher than a set, selected, or predetermined temperature, the opening/closing plate of the valve may be deformed into the second shape, depending on the deformation of the opening/closing plate, the first bracket and the second bracket may move by the other end of the opening/closing plate so that the first blocking portion of the first bracket may open the first communication hole, and the second blocking portion of the second bracket may block the second communication hole.

In some embodiments, the second shape may be a shape in which the other end of the opening/closing plate is deformed to move the first bracket and the second bracket toward the second communication hole.

In some embodiments, both ends of the opening/closing plate may be implemented as fixed ends that are fixed between the dust cover and the absorbent cover, and the central portion of the opening/closing plate may be implemented as a free end that is inserted between the first bracket and the second bracket.

In some embodiments, when the surrounding temperature of the valve is below a set, selected, or predetermined temperature, the opening/closing plate of the valve may be deformed to the first shape, depending on the deformation of the opening/closing plate, the first bracket and the second bracket may move by the central portion of the opening/closing plate so that the first blocking portion of the first bracket may block the first communication hole, and the second blocking portion of the second bracket may open the second communication hole.

In some embodiments, when the ambient temperature of the valve is higher than a set, selected, or predetermined temperature, the opening/closing plate of the valve may be deformed into the second shape, depending on the deformation of the opening/closing plate, the first bracket and the second bracket may move by the central portion of the opening/closing plate so that the first blocking portion of the first bracket may open the first communication hole, and the second blocking portion of the second bracket may block the second communication hole.

In some embodiments, a membrane provided in the second communication hole to prevent a moisture from the outside of the dust cover from flowing in may be further included.

A lamp for a vehicle according to an embodiment of the present disclosure may include the above-described dehumidifier.

According to an embodiment of the present disclosure, when the vehicle is parked, a moist air from the outside may be prevented from flowing into the interior of the dehumidifier and the lamp, thereby preventing the deterioration of the performance of the desiccant.

According to an embodiment of the present disclosure, by discharging the moist air absorbed by the desiccant to the outside of the dehumidifier while the vehicle is running, the performance of the desiccant may be improved.

Advantages that can be obtained or expected from example embodiments of the present disclosure are directly or suggestively described in the following detailed description. That is, various advantages expected from example embodiments of the present disclosure will be described in the following detailed description.

BRIEF DESCRIPTION OF THE DRAWINGS

The drawings are provided for reference to explain an illustrative example embodiment of the present disclosure, and the technical spirit of the present disclosure should not be interpreted to be necessarily limited to the accompanying drawings.

Figure 1:
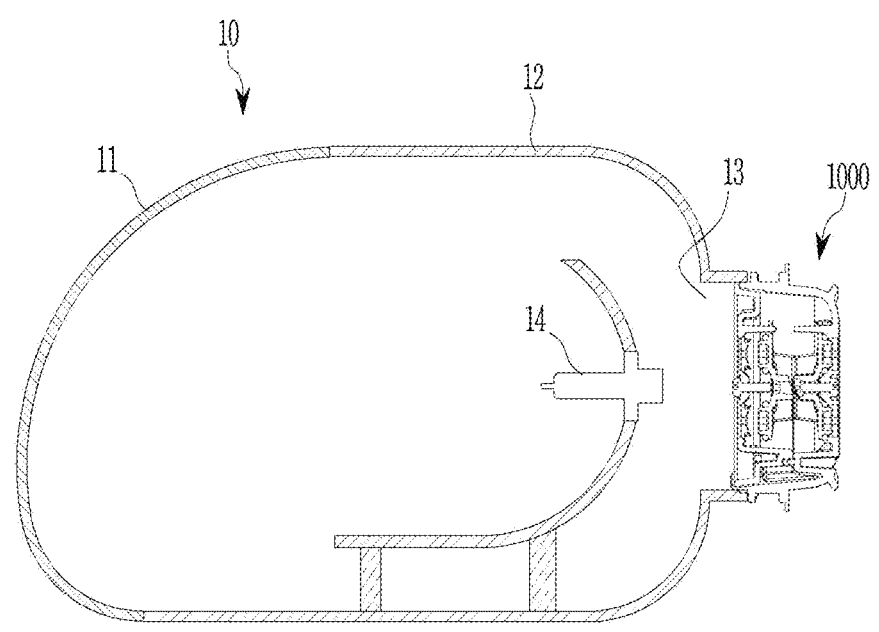
FIG. 1 is a cross-sectional view illustrating a configuration of a lamp for a vehicle according to an embodiment of the present disclosure.

It can be understood that the above-referenced drawings are not necessarily to scale, and can be presenting a somewhat simplified representation of various features illustrative of some principles of example embodiments of the present disclosure. The specific design features of example embodiments of the present disclosure, including, for example, specific dimensions, orientations, locations, and shapes, can be determined in part by a particular intended application and use environment, for example.

DETAILED DESCRIPTION OF ILLUSTRATIVE EMBODIMENTS

Terminology used herein is for the purpose of describing particular example embodiments, and is not intended to necessarily limit the present disclosure. As used herein, singular forms can be intended to also include a plurality of forms, unless the context clearly indicates otherwise. It can be understood that the terms "comprises" or "have" used in the present specification specify the presence of stated features, numerals, steps, operations, components, parts, or a combination thereof, but does not preclude the presence or addition of one or more other features, numerals, steps, operations, components, parts, or a combination thereof. Also, as used herein, the term "and/or" includes any plurality of combinations of items or any of a plurality of listed items.

The present disclosure will be described more fully hereinafter with reference to the accompanying drawings, in which example embodiments of the disclosure are shown. As those skilled in the art can realize, the described embodiments may be modified in various different ways, all without departing from the spirit or scope of the present disclosure.

To clearly explain the present disclosure, parts that are not related to the explanation can be omitted. Like reference numerals can designate like elements throughout the specification.

Because the sizes and thicknesses of constituent members shown in the accompanying drawings can be arbitrarily given for better understanding and ease of description, the present disclosure is not necessarily limited to the illustrated sizes and thicknesses, and the thicknesses can be shown enlarged to clearly express various parts and regions.

In describing example embodiments of the present specification, when it is determined that a detailed description of the well-known art associated with the present disclosure may obscure the gist of the present disclosure, it can be omitted.

The accompanying drawings are provided to allow example embodiments disclosed in the present specification to be easily understood and are not to be interpreted as necessarily limiting the spirit disclosed in the present disclosure, and it can be understood that the present disclosure can include modifications, equivalents, and substitutions without departing from the scopes and spirit of the present disclosure.

Terms including ordinal numbers such as "first," "second," and the like, can be used merely to describe various components, and are not to be interpreted as limiting these components. Such terms can be used merely to differentiate one component from other components.

In the description, expressions described in the singular in this specification may be interpreted as the singular or plural unless an explicit expression such as "one" or "single" is used.

Hereinafter, a dehumidifier for a lamp for a vehicle according to an embodiment of the present disclosure is described in detail with reference to attached drawings.

FIG. 1 is a cross-sectional view illustrating a configuration of a lamp for a vehicle according to an embodiment of the present disclosure.

A lamp 10 for a vehicle according to an embodiment of the present disclosure as shown in FIG. 1 may be installed in a lamp 10 provided in a vehicle.

The lamp 10 for the vehicle may include a lens 11, a housing 12, a light source module 14, and a dehumidifier 1000.

The lens 11 may be coupled to the housing 12 and emit a light from the light source module 14 to the outside. The lens 11 and the housing 12 may be combined to form the overall appearance of the lamp 10 for the vehicle, and the light source module 14 may be installed inside the appearance formed by the combination of the lens 11 and the housing 12.

A light source insertion hole 13 into which the light source module 14 may be inserted may be formed in the housing 12, and, if necessary, the light source module 14 may be replaced through the light source insertion hole 13.

The light source module 14 irradiates a light, and the light irradiated from the light source module 14 may be emitted to the outside of the lamp 10 through the lens 11.

A dehumidifier 1000 may be provided in the light source insertion hole 13, and the dehumidifier 1000 may be coupled to the light source insertion hole 13 such that the light source insertion hole 13 is blocked. However, the method of combining the dehumidifier 1000 according to an embodiment of the present disclosure may not be limited thereto.

Next, the dehumidifier of the lamp for the vehicle according to an example embodiment of the present disclosure will be described in detail with reference to attached drawings.

Figure 2:
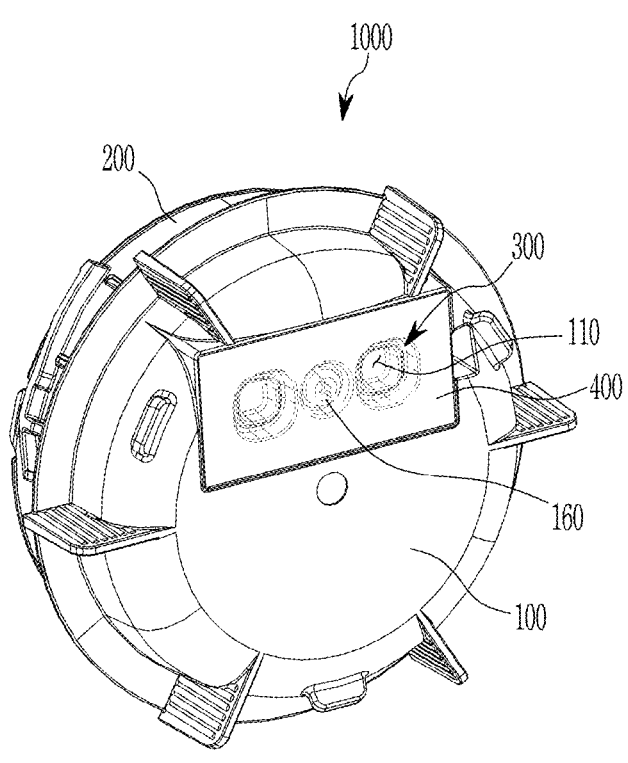
FIG. 2 is a perspective view illustrating a configuration of a dehumidifier according to an embodiment of the present disclosure.
Figure 3:
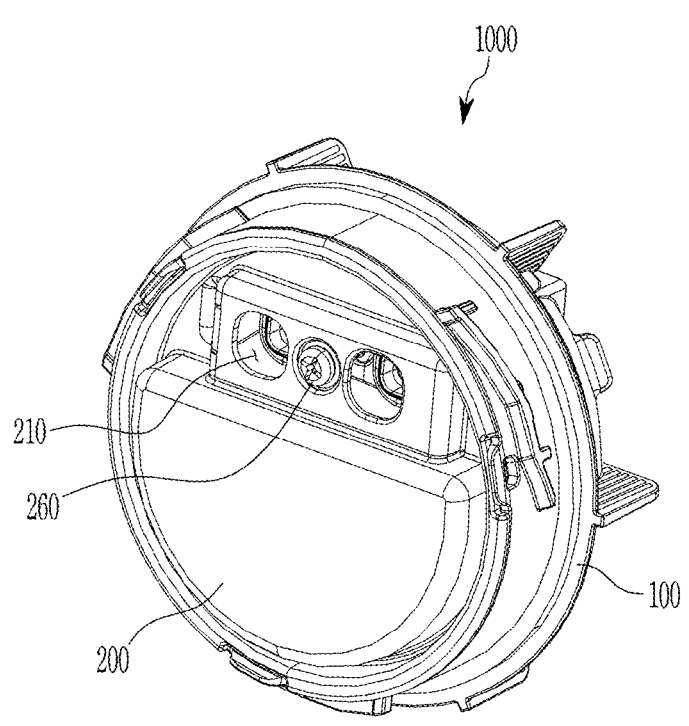
FIG. 3 is a perspective view illustrating a configuration of a dehumidifier according to an embodiment of the present disclosure.
Figure 4:
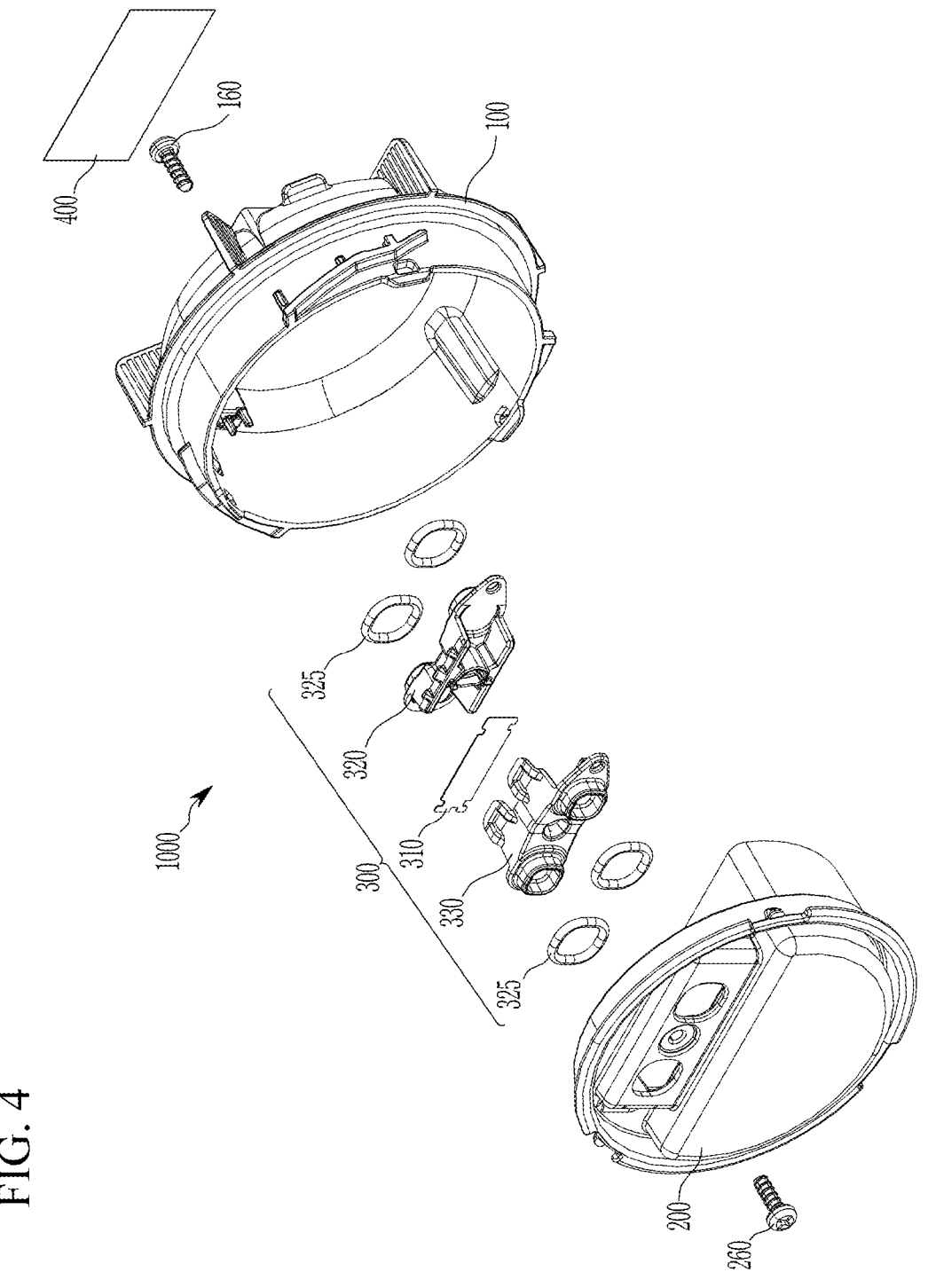
FIG. 4 is an exploded perspective view illustrating a configuration of a dehumidifier according to an embodiment of the present disclosure.

FIG. 2 and FIG. 3 are perspective views illustrating a configuration of a dehumidifier according to an embodiment of the present disclosure. FIG. 4 is an exploded perspective view illustrating a configuration of a dehumidifier according to an embodiment of the present disclosure.

As shown in FIG. 2 to FIG. 4, the dehumidifier 1000 of the lamp for the vehicle according to an embodiment of the present disclosure may include a dust cover 100 in which a first communication hole 110 is formed, an absorbent cover 200 in which a second communication hole 210 corresponding to the first communication hole 110 is formed, and a valve 300 selectively opening the first communication hole 110 and the second communication hole 210.

The dust cover 100 may be provided in and/or over the light source insertion hole 13 of the lamp 10 for the vehicle, and a receiving space may be formed inside. The dust cover 100 may be formed into a concave cup or container shape with an opening in the direction toward the housing 12 and the lens 11.

By combining the dust cover 100 and the absorbent cover 200, the receiving space may be closed and sealed. For this purpose, gaskets may be provided on the outside of the dust cover 100 and/or the outside of the absorbent cover 200.

Figure 5:
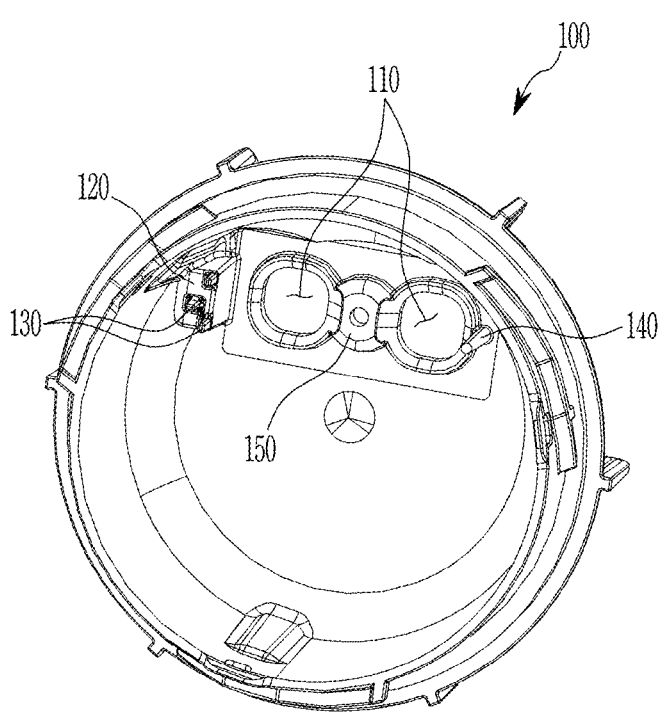
FIG. 5 is a perspective view showing a configuration of a dust cover of a dehumidifier according to an embodiment of the present disclosure.

Referring to FIG. 5, the first communication hole 110 formed in the dust cover 100 may be formed by penetrating between the inside and the outside of the dust cover 100. The first communication hole 110 formed in the dust cover 100 may be formed in a pair, but not necessarily.

On one side of the inner surface of the dust cover 100, a first valve fixing portion 120 may be formed to protrude toward the inner space of the lamp 10 (or, the absorbent cover 200). A valve fixing protrusion 130 may be formed at the end of the first valve fixing portion 120. The valve fixing protrusion 130 may be formed in multiples, but not necessarily.

On the other side of the inner surface of the dust cover 100, a first guide boss 140 may be formed to protrude toward the inner space of the lamp 10 (or, the absorbent cover 200). The first valve fixing portion 120 and the first guide boss 140 may be formed on both sides of the first communication hole 110, respectively.

A first bolt fastening hole 150 may be formed in the center of a pair of first communication holes 110, and a first bolt 160 may be engaged with the first bolt fastening hole 150. The end of the first bolt 160 may be equipped with a magnetic body 170 (see, e.g., FIG. 8). The other end of an opening/closing plate 310 may be selectively attached to the magnetic body 170 provided on the first bolt 160.

According to an embodiment of the present disclosure, a dehumidifier 1000 of the lamp for the vehicle may include a membrane 400 that can be provided in and/or over the first communication hole 110 and can block a moisture from flowing into the interior of the lamp 10. The membrane 400 may be bonded to the circumference of the first communication hole 110, and the first communication hole 110 may be blocked by the membrane 400. The membrane 400 may be formed of a material that does not allow a water (moisture) to pass through but allows a humidity (an aqueous vapor) to pass through. Accordingly, the water may be prevented from flowing from the outside of lamp 10 into the inside of lamp 10, and the humidity inside the lamp 10 may be discharged to the outside of the lamp 10.

The absorbent cover 200 may be combined with the dust cover 100. The absorbent cover 200 may be coupled to the dust cover 100, and a receiving space may be closed and sealed by the coupling of the absorbent cover 200 and the dust cover 100.

The absorbent cover 200 may accommodate a desiccant 270, which can absorb the humidity included in the air. The desiccant 270, used in the lamp 10 for the vehicle, may absorb a moisture by solidifying through a chemical reaction with a moisture. The desiccant 270 can absorb the moisture, and the moisture absorbed by the desiccant 270 may be released to the outside.

Figure 6:
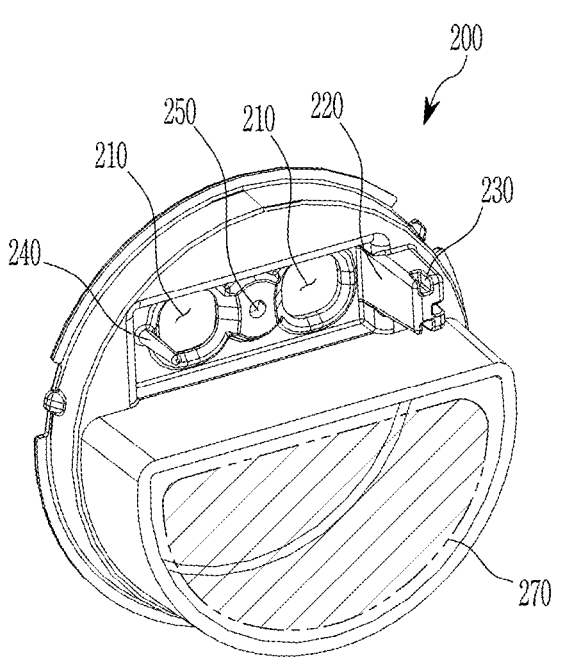
FIG. 6 is a perspective view illustrating a configuration of an absorbent cover of a dehumidifier according to an embodiment of the present disclosure.

Referring to FIG. 6, the second communication hole 210 formed in the absorbent cover 200 may be formed in a shape corresponding to the first communication hole 110 formed in the dust cover 100. The second communication hole 210 formed in the absorbent cover 200 may be formed in a pair.

A second valve fixing portion 220 may be formed on one side of the inner surface of the absorbent cover 200 to protrude toward the dust cover 100. A valve fixing groove 230 corresponding to the valve fixing protrusion 130 of the first valve fixing portion 120 may be formed at the end of the second valve fixing portion 220. The valve fixing protrusion 130 of the first valve fixing portion 120 may be inserted into the valve fixing groove 230. The valve fixing groove 230 may be formed in multiples. The second valve fixing portion 220 may be formed at a position corresponding to the first valve fixing portion 120. For example, the first valve fixing portion 120 and the second valve fixing portion 220 may be arranged to face each other.

A second guide boss 240 protruding toward the dust cover 100 may be formed on the other side of the inner surface of the absorbent cover 200. The second valve fixing portion 220 and the second guide boss 240 may be formed on both sides of the second communication hole 210, respectively.

A second bolt fastening hole 250 can be formed in the center of the pair of second communication holes 210, and a second bolt 260 may be engaged with the second bolt fastening hole 250. The end of the second bolt 260 may be equipped with a magnetic body 170 (see, e.g., FIG. 8). The other end of the opening/closing plate 310 may be selectively attached to the magnetic body 170 provided on the second bolt 260.

The valve 300 may selectively open the first communication hole 110 and the second communication hole 210 by a shape memory alloy that can be deformed by the temperature difference between the inside and outside of the dust cover 100 (or the change in the surrounding temperature of the valve 300). When the first communication hole 110 is blocked by the valve 300, the second communication hole 210 may be opened, and when the first communication hole 110 is opened, the second communication hole 210 may be blocked. The valve 300 may be installed between the dust cover and the absorbent cover 200.

Figure 7:
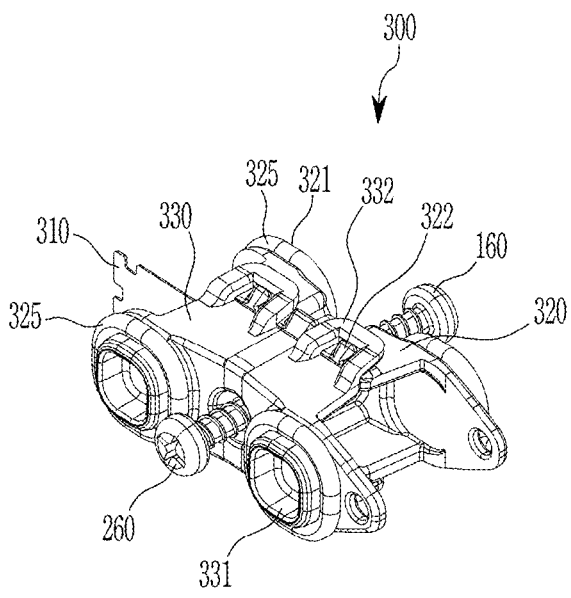
FIG. 7 is a perspective view showing a configuration of a valve of a dehumidifier according to an embodiment of the present disclosure.
Figure 8:
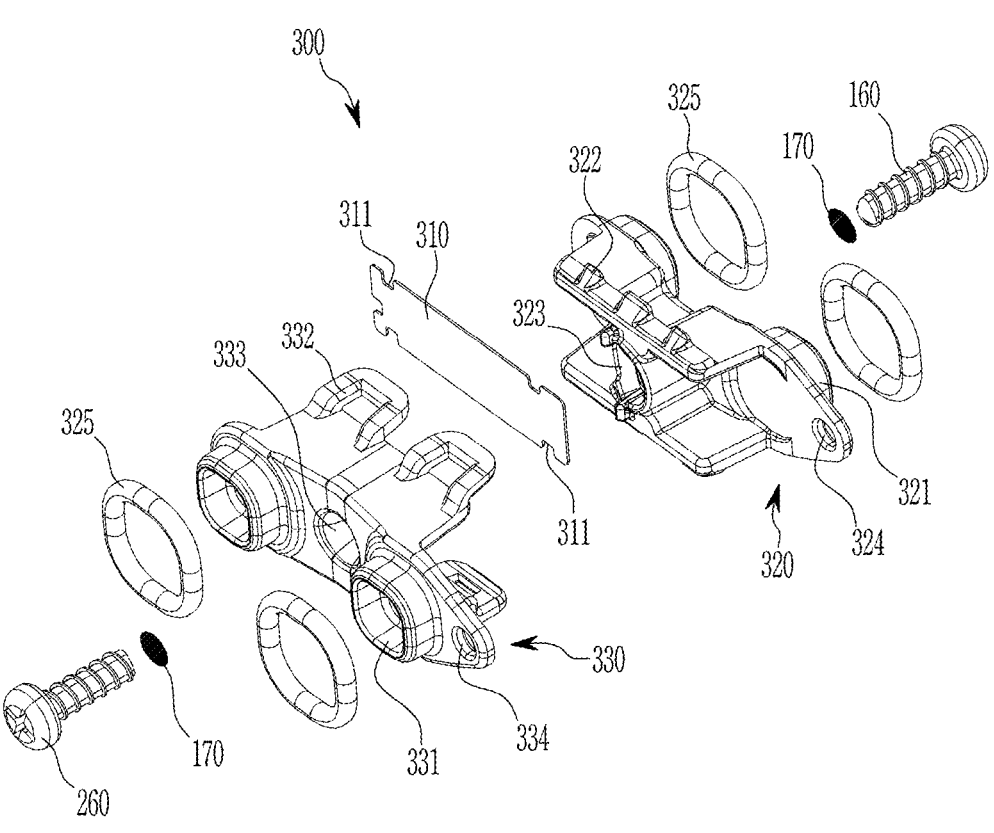
FIG. 8 is an exploded perspective view showing a configuration of a valve of a dehumidifier according to an embodiment of the present disclosure.

Referring to FIG. 7 and FIG. 8, the valve 300 may include an opening/closing plate 310, a first bracket 320, and a second bracket 330.

The opening/closing plate 310 may be formed of a shape memory alloy and may be deformed into a first shape and a second shape according to the temperature change to cause a reciprocal movement of the first bracket 320 and the second bracket 330 in a set, selected, or predetermined direction.

The first shape can be the shape of the opening/closing plate 310 when the ambient temperature of the opening/closing plate 310 is below a set, selected, or predetermined temperature (e.g., when the vehicle is parked), and in this case, it may be state that the vehicle with the lamp 10 turned off is parked. When the shape of the opening/closing plate 310 is the first shape, the first communication hole 110 may be blocked and the second communication hole 210 may be opened. The first shape may be a shape that is deformed so that the other end of the opening/closing plate 310 moves the first bracket 320 and the second bracket 330 toward the first communication hole 110.

The second shape can be the shape of the opening/closing plate 310 when the ambient temperature of the opening/closing plate 310 is higher than a set, selected, or predetermined temperature (e.g., when the vehicle is in motion), and in this case, the vehicle with the lamp 10 turned on may be in motion.

When the shape of the opening/closing plate 310 is the second shape, the first communication hole 110 may be opened and the second communication hole 210 may be blocked. The second shape may be a shape in which the other end of the opening/closing plate 310 is deformed to move the first bracket 320 and the second bracket 330 toward the second communication hole 210.

The opening/closing plate 310 can be formed in a roughly plate shape, and an opening/closing fixing hole 311 (or slot) may be formed at the end. The opening/closing fixing hole 311 may be formed to correspond to the valve fixing protrusion 130 of the first valve fixing portion 120 formed in the dust cover 100.

One end of the opening/closing plate 310 may be fixed between the dust cover 100 and the absorbent cover 200, and the other end of the opening/closing plate 310 may be inserted between the first bracket 320 and the second bracket 330. Accordingly, one end of the opening/closing plate 310 may be implemented as a fixed end and the other end as a free end.

The first bracket 320 may include a first bracket body, and a first blocking portion 321 formed on the first bracket body. The first blocking portion 321 may be formed in a shape corresponding to the first communication hole 110 formed in the dust cover 100. The first blocking portion 321 may be formed in a pair to correspond to the pair of first communication holes 110. When the first blocking portion 321 is inserted into the first communication hole 110 depending on the moving of the first bracket 320, the first communication hole 110 may be blocked. The first blocking portion 321 may be provided with an O-ring 325 (or gasket, or sealing member), and when the first communication hole 110 is blocked by the first blocking portion 321, the first communication hole 110 may be closed and sealed by the O-ring 325.

A hook protrusion 322 may be formed on the upper and lower parts of the first bracket 320 body.

A first bolt hole 323 may be formed between the pair of first blocking portions 321. The first bolt 160 engaged with the first bolt fastening hole 150 of the dust cover 100 may be movably inserted through the first bolt hole 323 of the first bracket 320.

A first guide hole 324 corresponding to the first guide boss 140 of the dust cover 100 may be formed in the first bracket 320 body of the first bracket 320. As will be described later, a first guide boss 140 may be movably inserted into first guide hole 324.

The second bracket 330 may include a second bracket body, and a second blocking portion 331 formed on the second bracket body. The second blocking portion 331 may be formed in a shape corresponding to the second communication hole 210 formed in the dust cover 100. The second blocking portion 331 may be formed in a pair corresponding to a pair of second communication holes 210. When the second blocking portion 331 is inserted into the second communication hole 210 depending on the moving of the second bracket 330, the second communication hole 210 may be blocked. The second blocking portion 331 may be provided with an O-ring 325 (or gasket, or sealing member), and when the second communication hole 210 is blocked by the second blocking portion 331, the second communication hole 210 may be closed and sealed by the O-ring 325.

A hook groove 332 may be formed on the upper and lower parts of the second bracket 330 body. The hook protrusion 322 of the first bracket 320 body can be hooked to the hook groove 332 of the second bracket 330 body (e.g., forming a clip fastener), so that the first bracket 320 and the second bracket 330 may move as one.

A second bolt hole 333 may be formed between the pair of second blocking portions 331. The second bolt 260 engaged with the second bolt fastening hole 250 of the absorbent cover 200 may be movably inserted through the second bolt hole 333 of the second bracket 330.

A second guide hole 334 corresponding to the second guide boss 240 of the absorbent cover 200 may be formed in the second bracket 330 body of the second bracket 330. As will be described later, a second guide boss 240 may be movably inserted into the second guide hole 334.

The first bracket 320 and the second bracket 330 may be provided to be integrally movable between the dust cover 100 and the absorbent cover 200 through a coupling member.

The coupling member may include a hook protrusion 322 formed in the first bracket body of the first bracket 320, and a hook groove 332 formed in the second bracket body of the second bracket 330, as described above. The positions of hook protrusion 322 and the hook groove 332 may be changed.

The dust cover 100, the absorbent cover 200, and the valve 300 may be provided with guide members that guide the movement of the first bracket 320 and the second bracket 330 when the first bracket 320 and the second bracket 330 move between the dust cover 100 and the absorbent cover 200.

As described above, the guide member may include a first guide boss 140 formed on the dust cover 100, a first guide hole 324 formed in the first bracket 320, a second guide boss 240 formed on the absorbent cover 200, and a second guide hole 334 formed in the second bracket 330.

When the first bracket 320 and the second bracket 330 are coupled together through the coupling member and move as one, the first guide boss 140 can be movably inserted into the first guide hole 324, and the second guide boss 240 can be movably inserted into the second guide hole 334. Accordingly, when the first bracket 320 and the second bracket 330 move, a distortion may be prevented.

The valve 300 may be provided with a fixing member that selectively fixes the position of the opening/closing plate 310 to a first position and a second position when the first bracket 320 and the second bracket 330 selectively block the first communication hole 110 and the second communication hole 210 according to the deformation of the opening/closing plate 310.

The fixing member may include a first bolt 160 provided on the dust cover 100, a second bolt 260 provided on the absorbent cover 200, and a magnetic body 170 provided on an end of each of the first bolt 160 and the second bolt 260.

When the opening/closing plate 310 is deformed into the first shape, the other end of the opening/closing plate 310 may be attached to the magnetic body 170 provided on the first bolt 160. When the opening/closing plate 310 is deformed into the second shape, the other end of the opening/closing plate 310 may be attached to the magnetic body 170 provided on the second bolt 260.

Because the other end of the opening/closing plate 310 can be selectively attached to the magnetic body 170 of the first bolt 160 and the second bolt 260, even if a vibration or an impact of the vehicle occurs, the opening/closing plate 310 may stably maintain the position thereof, and the opened or closed state of the first communication hole 110 or the second communication hole 210 may be stably maintained.

Referring again to FIG. 4, an assembly process of the dust cover 100, the absorbent cover 200, and the valve 300 will be described.

First, the other end of the opening/closing plate 310 can be inserted between the first bracket 320 body of the first bracket 320 and the bracket body of the second bracket 330.

As the hook protrusion 322 of the first bracket 320 body can be coupled to the hook groove 332 of the second bracket 330 body so that the other end of the opening/closing plate 310 is inserted between the first bracket 320 and the second bracket 330 and the opening/closing plate 310 is deformed, the first bracket 320 and the second bracket 330 can move as one body.

One end of the opening/closing plate 310 can be fixed between the first valve fixing portion 120 formed on the dust cover 100 and the second valve fixing portion 220 formed on the absorbent cover 200.

When the dust cover 100 and the absorbent cover 200 are combined, the end of the first valve fixing portion 120 of the dust cover 100 and the end of the second valve fixing portion 220 of the absorbent cover 200 can be in close contact. The valve fixing protrusion 130 of the first valve fixing portion 120 of the dust cover 100 may penetrate the valve fixing groove 230 of the opening/closing plate 310 and then be inserted into the valve fixing groove 230 of the second valve fixing portion 220 of the absorbent cover 200. Accordingly, one end of the opening/closing plate 310 may be fixedly installed between the dust cover 100 and the absorbent cover 200.

After installing the valve 300 between the dust cover 100 and the absorbent cover 200, the first bolt 160 can be engaged with the first bolt fastening hole 150 of the dust cover 100, and the first bolt hole 323 of the first bracket 320 can be coupled so as to be relatively movable with respect to the first bolt 160. The second bolt 260 can be engaged with the second bolt fastening hole 250 of the absorbent cover 200, and the second bolt hole 333 of the second bracket 330 can be coupled so as to be relatively movable with respect to the second bolt 260.

Hereinafter, the operation of a valve according to an embodiment of the present disclosure will be described in detail with reference to attached drawings.

Figure 9:
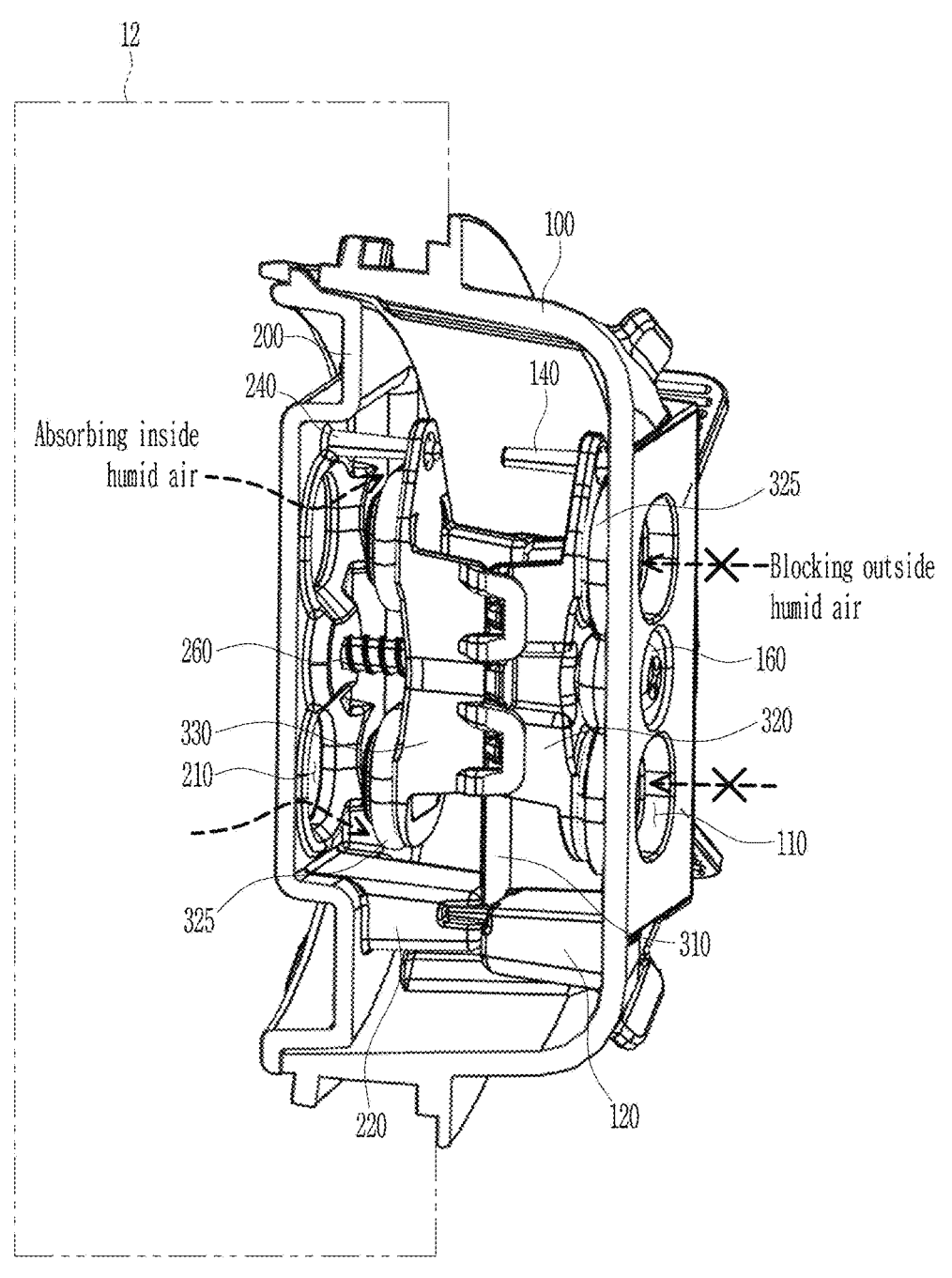
FIG. 9 and FIG. 10 are views for explaining an operation of a dehumidifier according to an embodiment of the present disclosure.
Figure 10:
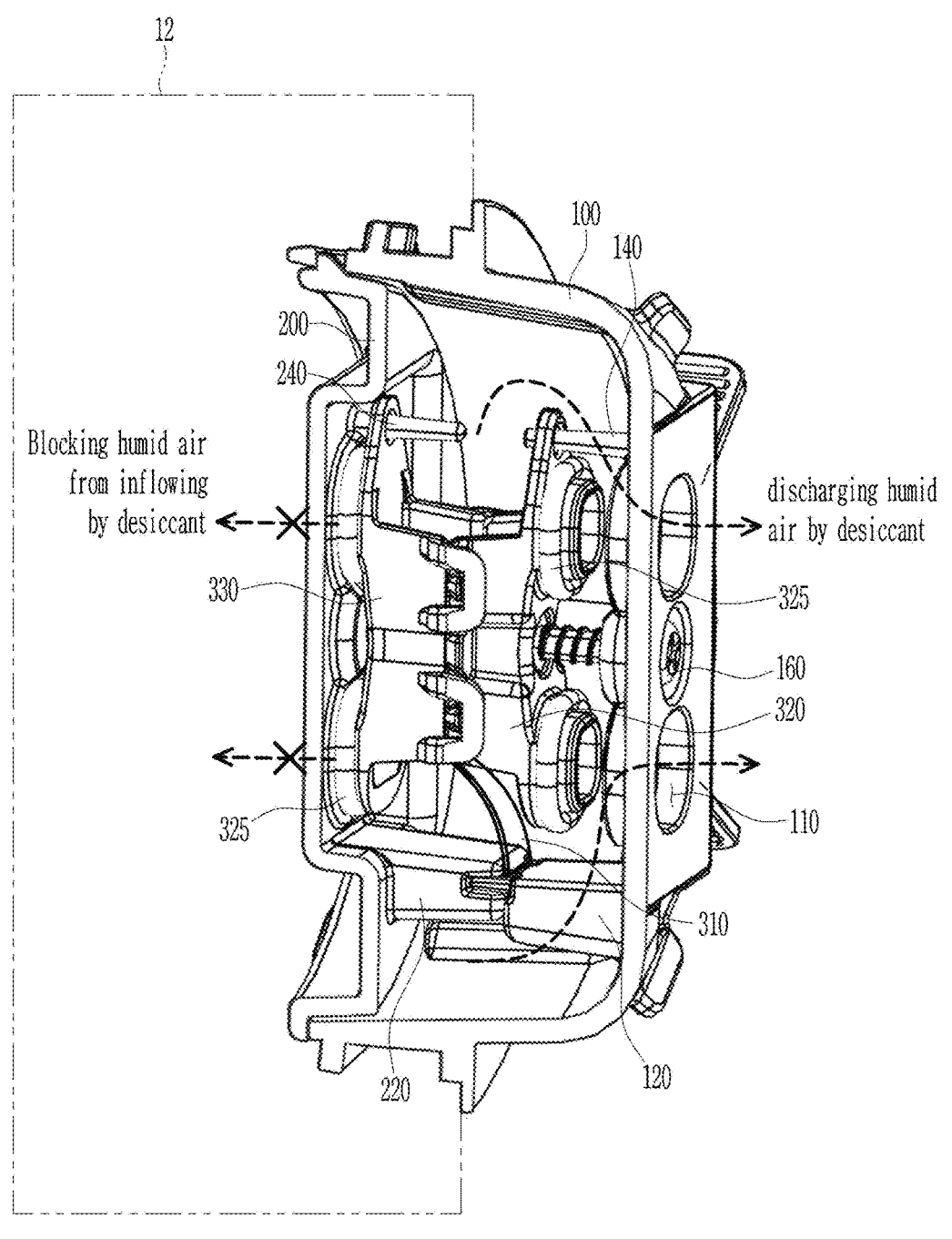

FIG. 9 and FIG. 10 are drawings illustrating an operation of a dehumidifier 1000 according to an embodiment of the present disclosure. FIG. 9 is the view to explain an operation of the dehumidifier 1000 when the vehicle is parked. FIG. 10 is the view to explain an operation of the dehumidifier 1000 while the vehicle is running.

First, referring to FIG. 9, when the vehicle is parked and not running, the lamp 10 of the vehicle may not turn on but may turn off. Accordingly, the ambient temperature of the opening/closing plate 310 of the valve 300 can be lowered below a set, selected, or predetermined temperature, and the opening/closing plate 310 may be deformed into the first shape.

As the opening/closing plate 310 is deformed into the first shape, the first bracket 320 and the second bracket 330 move toward the dust cover 100, and the first blocking portion 321 of the first bracket 320 blocks the first communication hole 110 of the dust cover 100. As the first bracket 320 and the second bracket 330 move toward the dust cover 100, the second blocking portion 331 of the second bracket 330 may be released from the second communication hole 210, and the second communication hole 210 may be opened.

As the first communication hole 110 is blocked by the opening/closing plate 310, the inflow of the moist air from the outside into the interior of the lamp 10 may be blocked.

Also, as the second communication hole 210 is opened, the moist air inside the lamp 10 can inflow into the receiving space of the dust cover 100 through the second communication hole 210 of the absorbent cover 200, and the moisture included in the air may be captured by the desiccant 270 accommodated in the absorbent cover 200.

The end of the opening/closing plate 310 is attached to the magnetic body 170 provided in the first bolt 160, so that even if a vibration or an impact occurs in the vehicle, the opening/closing plate 310 may be prevented from being separated from the first communication hole 110.

Referring to FIG. 10, when the vehicle is running and the lamp 10 of the vehicle is turned on, the temperature inside the lamp 10 can increase. Accordingly, the ambient temperature of the opening/closing plate 310 of the valve 300 can increase above a set, selected, or predetermined temperature, and the opening/closing plate 310 may be deformed into the second shape.

As the opening/closing plate 310 is deformed into the second shape, the first bracket 320 and the second bracket 330 may move toward the absorbent cover 200, and the first blocking portion 321 of the first bracket 320 may be separated from the first communication hole 110 of the dust cover 100, so that the first communication hole 110 may be opened. As the first bracket 320 and the second bracket 330 move toward the absorbent cover 200, the second blocking portion 331 of the second bracket 330 can block the second communication hole 210.

As the first communication hole 110 is opened by the opening/closing plate 310, the moist air of the desiccant 270 included in the absorbent cover 200 may be discharged to the outside through the first communication hole 110.

Also, as the second communication hole 210 is blocked, the air inside the lamp 10 does not flow into the receiving space of the dust cover 100.

Hereinafter, a dehumidifier of a lamp for a vehicle according to another embodiment of the present disclosure is described in detail with reference to attached drawings.

Figure 11:
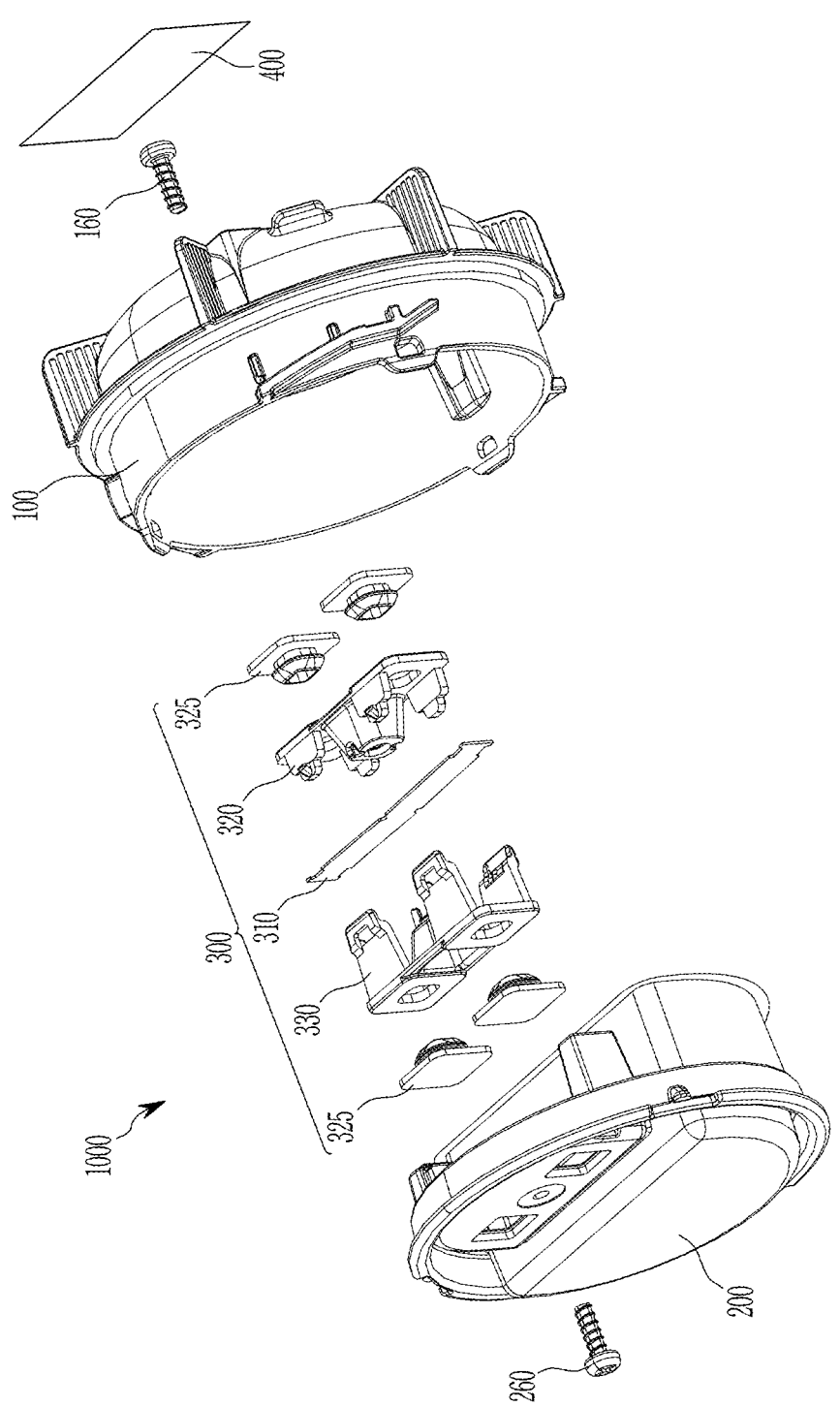
FIG. 11 is an exploded perspective view illustrating a configuration of a dehumidifier according to an embodiment of the present disclosure.
Figure 12:
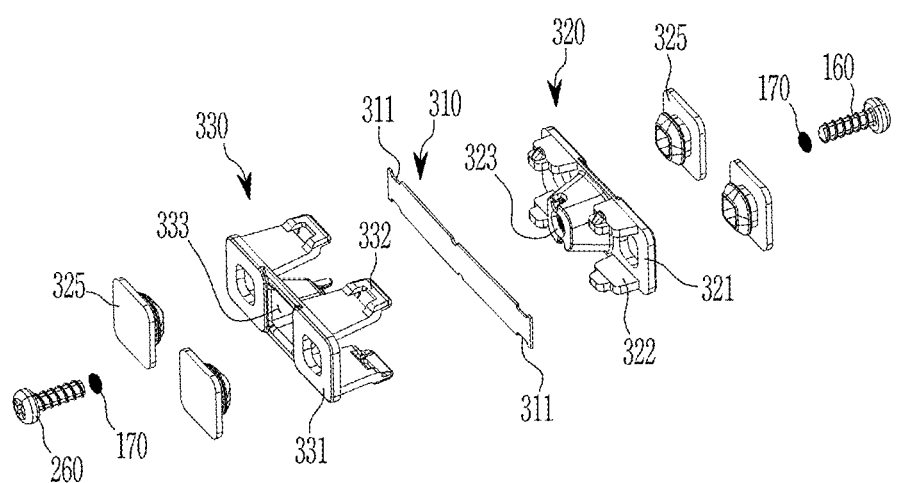
FIG. 12 is an exploded perspective view showing a configuration of a valve of a dehumidifier according to an embodiment of the present disclosure.
Figure 13:
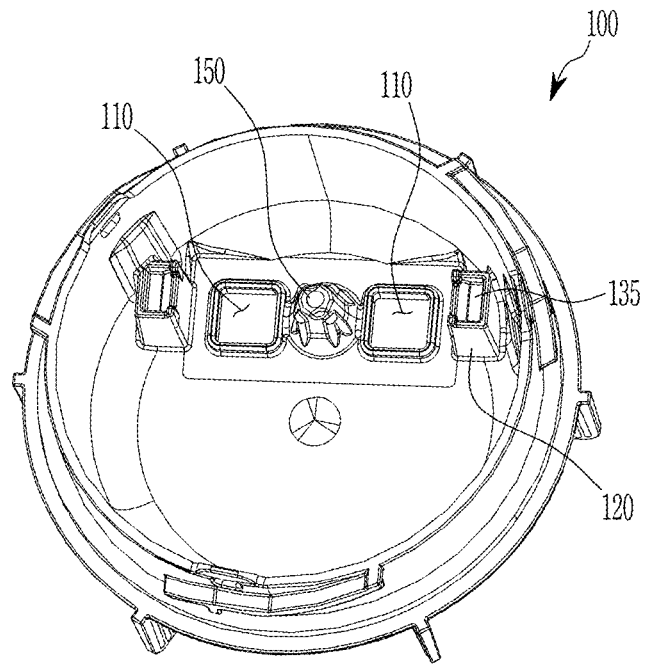
FIG. 13 is a perspective view showing a configuration of a dust cover of a dehumidifier according to an embodiment of the present disclosure.
Figure 14:
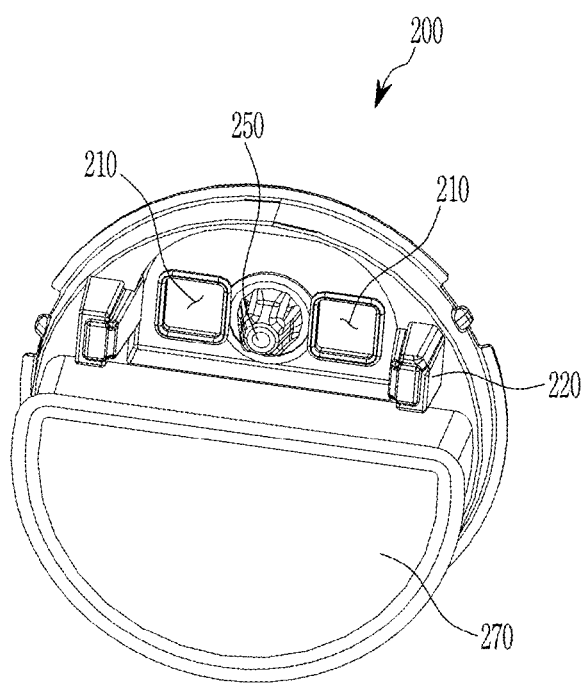
FIG. 14 is a perspective view showing a configuration of an absorbent cover of a dehumidifier according to an embodiment of the present disclosure.

FIG. 11 is an exploded perspective view illustrating a configuration of a dehumidifier according to an embodiment of the present disclosure. FIG. 12 is an exploded perspective view showing a configuration of a valve of a dehumidifier according to an embodiment of the present disclosure. FIG. 13 is a perspective view showing a configuration of a dust cover of a dehumidifier according to an embodiment of the present disclosure. FIG. 14 is a perspective view showing a configuration of an absorbent cover of a dehumidifier according to an embodiment of the present disclosure.

The dehumidifier 1000 described with reference to FIG. 1 to FIG. 10 and the dehumidifier 1000 illustrated with reference to FIG. 11 to FIG. 14 are different in the shape and the operation of the opening/closing plate 310 of the valve 300 and the mounting structure of the opening/closing plate 310, but the remaining configuration can be substantially similar to the dehumidifier 1000 described with reference to FIG. 1 to FIG. 10. Therefore, the following explanation will focus on the parts that are different from the configuration in FIG. 1 to FIG. 10.

The valve 300 of the dehumidifier 1000, referring to FIG. 11 to FIG. 14, according to an embodiment of the present disclosure may include an opening/closing plate 310, a first bracket 320, and a second bracket 330.

The opening/closing plate may be is formed of a shape memory alloy and can be deformed into a first shape and a second shape according to a temperature change to cause a reciprocal movement of the first bracket 320 and the second bracket 330 in a set, selected, or predetermined direction.

The first shape can be the shape of the opening/closing plate 310 when the ambient temperature of the opening/closing plate 310 is below a set, selected, or predetermined temperature (e.g., when the vehicle is parked), and in this case, it may be state that the vehicle with the lamp 10 turned off is parked. The first shape may be a shape that is deformed so that the other end of the opening/closing plate 310 moves the first bracket 320 and the second bracket 330 toward the first communication hole 110. The first shape may be a shape in which the central portion of the opening/closing plate 310 is deformed to move the first bracket 320 and the second bracket 330 toward the first communication hole 110. In other words, the first shape can be that the opening/closing plate 310 is flat.

The second shape can be the shape of the opening/closing plate 310 when the ambient temperature of the opening/closing plate 310 is higher than a set, selected, or predetermined temperature (e.g., when the vehicle is in motion), and in this case, the vehicle with the lamp 10 turned on may be in motion. When the shape of the opening/closing plate 310 is the second shape, the first communication hole 110 may be opened and the second communication hole 210 may be blocked. The second shape may be a shape in which the central portion of the opening/closing plate 310 is deformed to move the first bracket 320 and the second bracket 330 toward the second communication hole 210. In other words, the second shape can be a state in which the center of the opening/closing plate 310 protrudes convexly toward the second communication hole 210.

The opening/closing plate 310 can be formed in a roughly plate shape, and an opening/closing fixing holes 311 (or slots) may be formed at each end.

Both ends of the opening/closing plate 310 may be fixed between the dust cover 100 and the absorbent cover 200, and the central portion of the opening/closing plate 310 may be inserted between the first bracket 320 and the second bracket 330. Accordingly, both ends of the opening/closing plate 310 may be implemented as fixed ends and/or restricted ends, and the central portion as a free end or bendable portion.

To fix or restrain both ends of the opening/closing plate 310 between the dust cover 100 and the absorbent cover 200, a first valve fixing portion 120 may be formed on the inner surface of the dust cover 100 to protrude toward the inner space of the lamp 10 (or the absorbent cover 200). The first valve fixing portion 120 may be formed on both sides of the pair of first communication holes 110. A valve fixing groove 230 into which both ends of the opening/closing plate 310 can be inserted and seated may be formed in the first valve fixing portion 120.

On the inner surface of the absorbent cover 200, a second valve fixing portion 220 may be formed to protrude toward the dust cover 100. The second valve fixing portion 220 may be formed at a position corresponding to the first valve fixing portion 120. The second valve fixing portion 220 may be formed on both sides of the pair of second communication holes 210.

When the dust cover 100 and the absorbent cover 200 are combined, when both ends of the opening/closing plate 310 are seated in the valve fixing groove 230 of the first valve fixing portion 120, and the second valve fixing portion 220 of the absorbent cover 200 is in close contact with the first valve fixing portion 120, both ends of the opening/closing plate 310 may be fixed and/or restrained between the first valve fixing portion 120 and the second valve fixing portion 220.

The operation of the dehumidifier 1000 of FIG. 11 to FIG. 14, according to an embodiment of the present disclosure, can be generally similar to the operation of the dehumidifier 1000 described reference to FIG. 1 to FIG. 10. However, there can be a difference in the shape when the opening/closing plate 310 is transformed into the first shape or the second shape.

Figure 15:
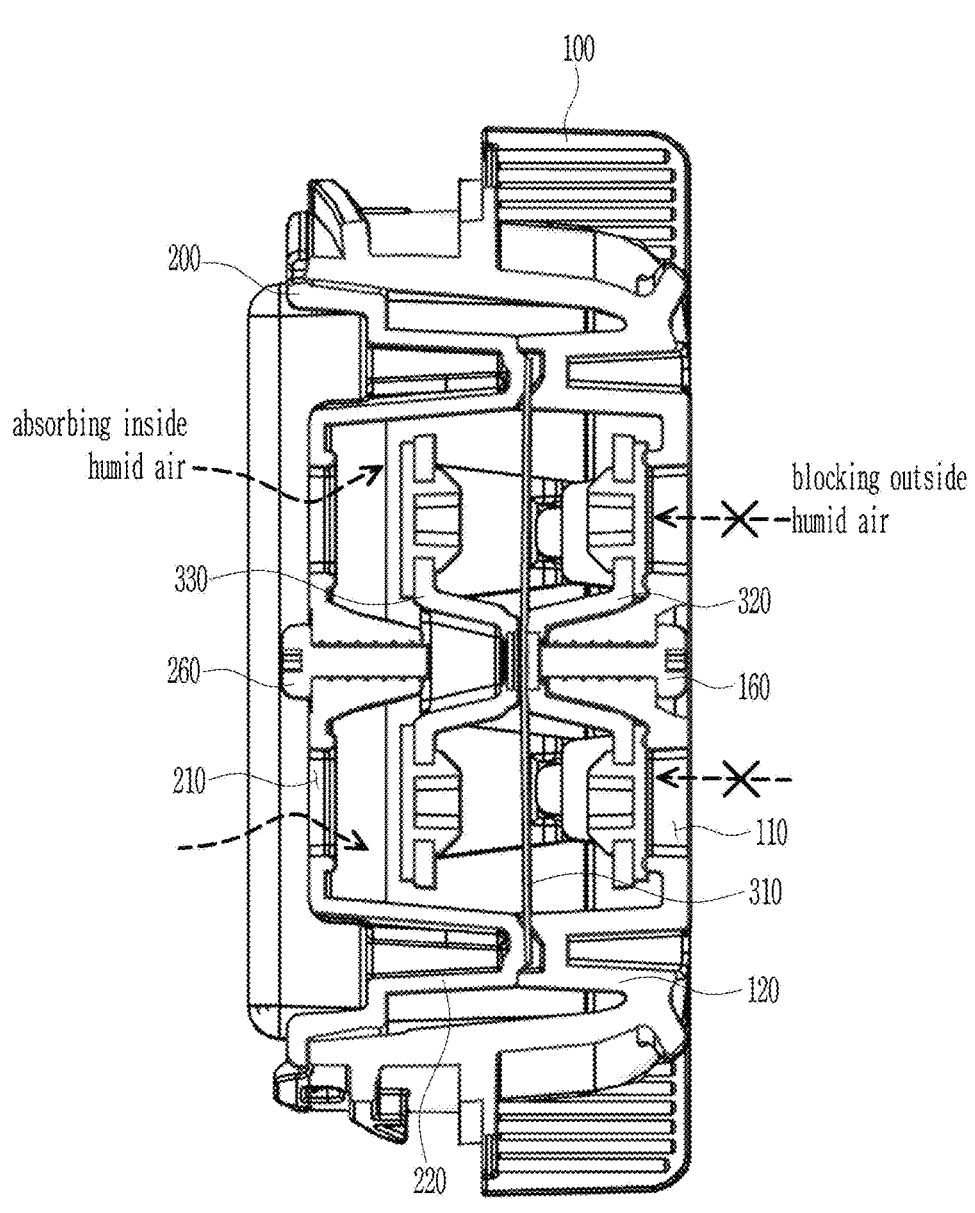
FIG. 15 and FIG. 16 are views illustrating an operation of a dehumidifier according to an embodiment of the present disclosure.

In an embodiment of the present disclosure, referring to FIG. 15, when the ambient temperature of the valve 300 is below a set, selected, or predetermined temperature, the opening/closing plate 310 may be deformed into the first shape, and the central portion of the opening/closing plate 310 may be formed by protruding toward the first communication hole 110. As the opening/closing plate 310 is deformed into the first shape, the first bracket 320 and the second bracket 330 can be moved by the central portion of the opening/closing plate 310, so that the first blocking portion 321 of the first bracket 320 blocks the first communication hole 110, and the second blocking portion 331 of the second bracket 330 opens the second communication hole 210.

Figure 16:
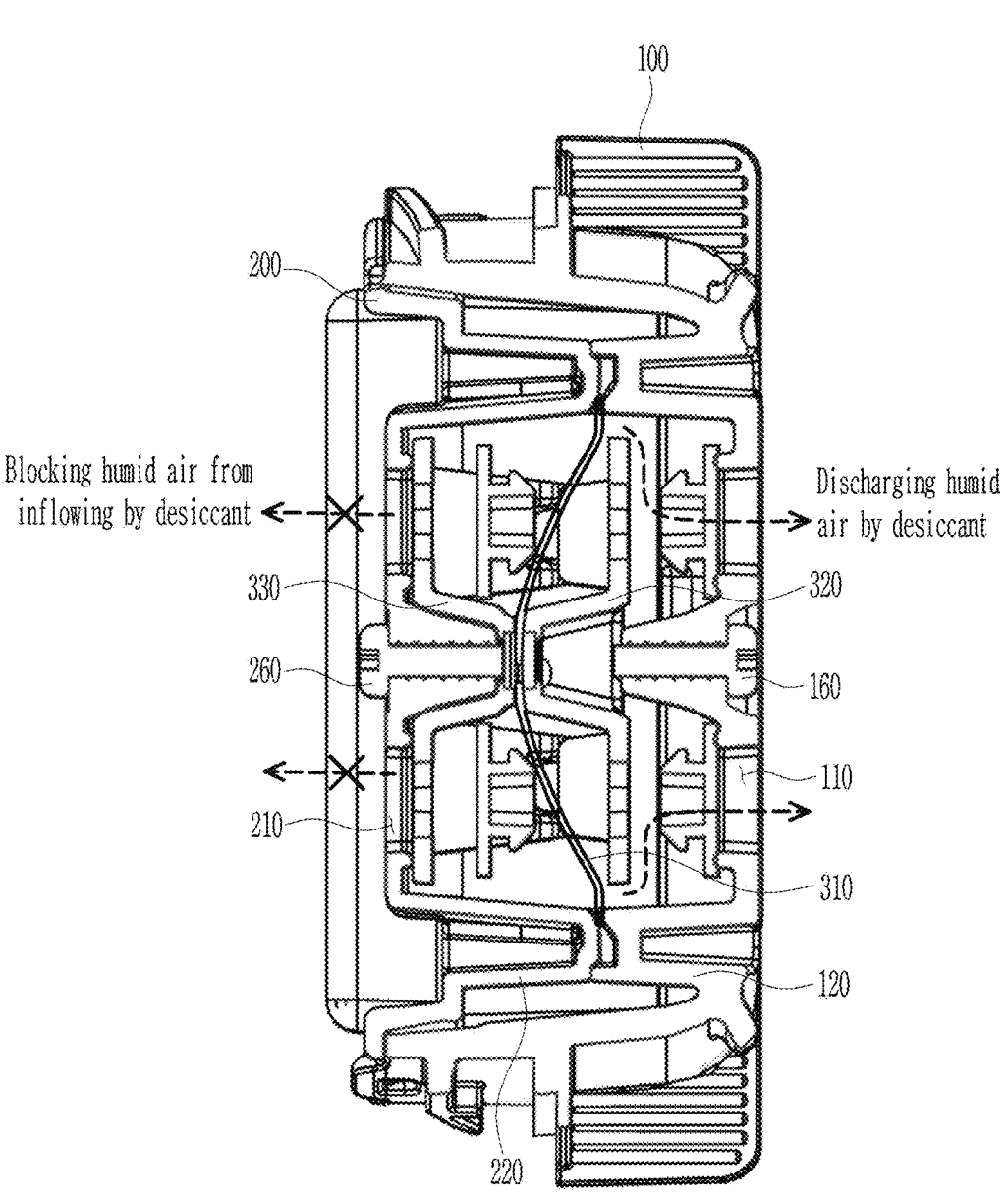

Referring to FIG. 16, when the surrounding temperature of the valve 300 is higher than the set, selected, or predetermined temperature, the opening/closing plate 310 can be deformed into the second shape, and the central portion of the opening/closing plate 310 may be formed by protruding toward the second communication hole 210. As the opening/closing plate 310 is deformed into the second shape, the first bracket 320 and the second bracket 330 can be moved by the central portion of the opening/closing plate 310, so that the first blocking portion 321 of the first bracket 320 opens the first communication hole 110, and the second blocking portion 331 of the second bracket 330 blocks the second communication hole 210.

According to an embodiment of the present disclosure, when the vehicle is parked, the inflow of the moist air from the outside into the interior of the dehumidifier 1000 and the lamp 10 may be prevented, thereby preventing the performance of the desiccant 270 from being deteriorated.

According to an embodiment of the present disclosure, by discharging the moist air absorbed by the desiccant 270 to the outside of the dehumidifier 1000 while the vehicle is running, the performance of the desiccant 270 may be improved.

According to an embodiment of the present disclosure, by opening and closing the communication hole without using a separate power source, the manufacturing cost of the vehicle may be reduced and the durability of the valve 300 may be improved.

While the present disclosure has been described in connection with what is presently considered to be practical example embodiments, it can be understood that the present disclosure is not necessarily limited to the disclosed embodiments, but, on the contrary, is intended to cover various modifications and equivalent arrangements included within the spirit and scopes of the appended claims.

What is claimed is:

1. A dehumidifier for a lamp of a vehicle comprising:
a dust cover configured to be coupled to a vehicle lamp housing of the lamp of the vehicle, the dust cover including a first communication hole therein;
a desiccant;
an absorbent cover coupled to the dust cover, wherein the desiccant is accommodated between the dust cover and the absorbent cover, wherein the absorbent cover includes a second communication hole therein, and wherein the second communication hole corresponds to the communication hole; and
a valve comprising:
a first bracket,
a second bracket coupled to the first bracket, and
a shape memory alloy disposed between the first bracket and the second bracket such that the valve is configured to selectively block the first communication hole and the second communication hole using the first bracket and the second bracket, respectively, by the first bracket and the second bracket being moved by the shape memory alloy being deformed by a temperature difference between an inside of the dust cover and an outside of the dust cover.

2. The dehumidifier of claim 1, wherein the valve comprises an opening/closing plate including the shape memory alloy and configured to be deformed into a first shape and a second shape according to a temperature change in the dust cover, thereby causing the first bracket and the second bracket to reciprocally move in a first direction;
wherein the first bracket is disposed on a first side of the opening/closing plate and wherein the first bracket includes a first blocking portion corresponding to the first communication hole; and
wherein the second bracket is disposed on a second side of the opening/closing plate and wherein the second bracket includes a second blocking portion corresponding to the second communication hole.

3. The dehumidifier of claim 2, wherein the first bracket and the second bracket are coupled by a coupling member so as to be able to move as one body.

4. The dehumidifier of claim 3, wherein the coupling member comprises:
a hook groove in one of the first bracket or the second bracket; and
a hook protrusion on another of the first bracket or the second bracket, wherein the hook protrusion is engaged into the hook groove.

5. The dehumidifier of claim 2, further comprising a guide member configured to guide a movement of the first bracket and the second bracket.

6. The dehumidifier of claim 5, wherein the guide member comprises:

a first guide boss on the dust cover;

a first guide hole in the first bracket and configured such that the first guide hole can be movable relative to the first guide boss and such that the first guide boss can be inserted into the first guide hole;

a second guide boss on the absorbent cover; and a second guide hole in the second bracket and configured such that the second guide hole can be movable relative to the second guide boss and such that the second guide boss can be inserted into the second guide hole.

7. The dehumidifier of claim 2, wherein the valve further comprises an O-ring disposed on each of the first blocking portion and the second blocking portion.

8. The dehumidifier of claim 2, further comprising a fixing member configured to selectively restrain the opening/closing plate in a first position and a second position based on the first bracket and the second bracket selectively blocking the first communication hole and the second communication hole, respectively, according to a deformation of the opening/closing plate.

9. The dehumidifier of claim 8, wherein the fixing member comprises:

a first bolt disposed in the dust cover;

a second bolt disposed in the absorbent cover; and a first magnetic body disposed on the first bolt; and a second magnetic body disposed on the second bolt, and configured such that the opening/closing plate is selectively attached the first magnetic body and the second magnetic body.

10. The dehumidifier of claim 2, wherein a first end of the opening/closing plate is fixed between the dust cover and the absorbent cover, and wherein a second end of the opening/closing plate is a free end that is inserted between the first bracket and the second bracket.

11. The dehumidifier of claim 10, wherein the valve is configured such that, based on the inside of the dust cover being below a first temperature, the opening/closing plate of the valve is deformed to the first shape, and wherein depending on a deformation of the opening/closing plate, the first bracket and the second bracket move by the second end of the opening/closing plate so that the first blocking portion of the first bracket blocks the first communication hole, and so that the second blocking portion of the second bracket opens the second communication hole.

12. The dehumidifier of claim 11, wherein the first shape is a state in which the second end of the opening/closing plate is deformed to move the first bracket and the second bracket toward the first communication hole.

13. The dehumidifier of claim 10, wherein the valve is configured such that, based on the inside of the dust cover being higher than a first temperature, the opening/closing plate of the valve is deformed to the second shape, and wherein depending on a deformation of the opening/closing plate, the first bracket and the second bracket move by the second end of the opening/closing plate so that the first blocking portion of the first bracket opens the first communication hole, and so that the second blocking portion of the second bracket blocks the second communication hole.

14. The dehumidifier of claim 13, wherein the second shape is a state in which the second end of the opening/closing plate is deformed to move the first bracket and the second bracket toward the second communication hole.

15. The dehumidifier of claim 2, wherein both ends of the opening/closing plate are restrained ends that are restrained between the dust cover and the absorbent cover, and wherein a central portion of the opening/closing plate is a bendable portion that is inserted between the first bracket and the second bracket.

16. The dehumidifier of claim 15, wherein the valve is configured such that, based on the inside of the dust cover being below a first temperature, the opening/closing plate of the valve is deformed to the first shape, and wherein depending on a deformation of the opening/closing plate, the first bracket and the second bracket move by the central portion of the opening/closing plate so that the first blocking portion of the first bracket blocks the first communication hole, and so that the second blocking portion of the second bracket opens the second communication hole.

17. The dehumidifier of claim 15, wherein the valve is configured such that, based on the inside of the dust cover being higher than a first temperature, the opening/closing plate of the valve is deformed into the second shape, and wherein depending on a deformation of the opening/closing plate, the first bracket and the second bracket move by the central portion of the opening/closing plate so that the first blocking portion of the first bracket opens the first communication hole, and so that the second blocking portion of the second bracket blocks the second communication hole.

18. The dehumidifier of claim 1, further comprising a membrane disposed at the first communication hole to prevent a moisture from the outside of the dust cover from flowing into the inside of the dust cover.

19. A lamp for a vehicle comprising:

a lamp housing;

a light source module within the lamp housing; and a dehumidifier attached to the lamp housing, wherein the dehumidifier comprises:

a dust cover including a first communication hole therein, a desiccant, an absorbent cover coupled to the dust cover, wherein the desiccant is accommodated between the dust cover and the absorbent cover, wherein the absorbent cover includes a second communication hole therein, and wherein the second communication hole corresponds to the first communication hole, and a valve comprising:

a first bracket, a second bracket coupled to the first bracket, and a shape memory alloy disposed between the first bracket and the second bracket such that the valve is configured to selectively block the first communication hole and the second communication hole using the first bracket and the second bracket, respectively, by the first bracket and the second bracket being moved by the shape memory alloy being deformed by a temperature difference between an inside of the dust cover and an outside of the dust cover.

20. The lamp of claim 19, wherein the valve comprises an opening/closing plate including the shape memory alloy and configured to be deformed into a first shape and a second shape according to a temperature change in the dust cover, thereby causing the first bracket and the second bracket to reciprocally move in a first direction;

wherein the first bracket is disposed on a first side of the opening/closing plate and wherein the first bracket includes at least one first blocking portion corresponding to the first communication hole; and wherein the second bracket is disposed on a second side of the opening/closing plate and wherein the second bracket includes at least one second blocking portion corresponding to the second communication hole.

* * * * *